March 15, 1960  J. N. ROGERS  2,928,203
TRAP
Filed Nov. 13, 1958  2 Sheets-Sheet 1
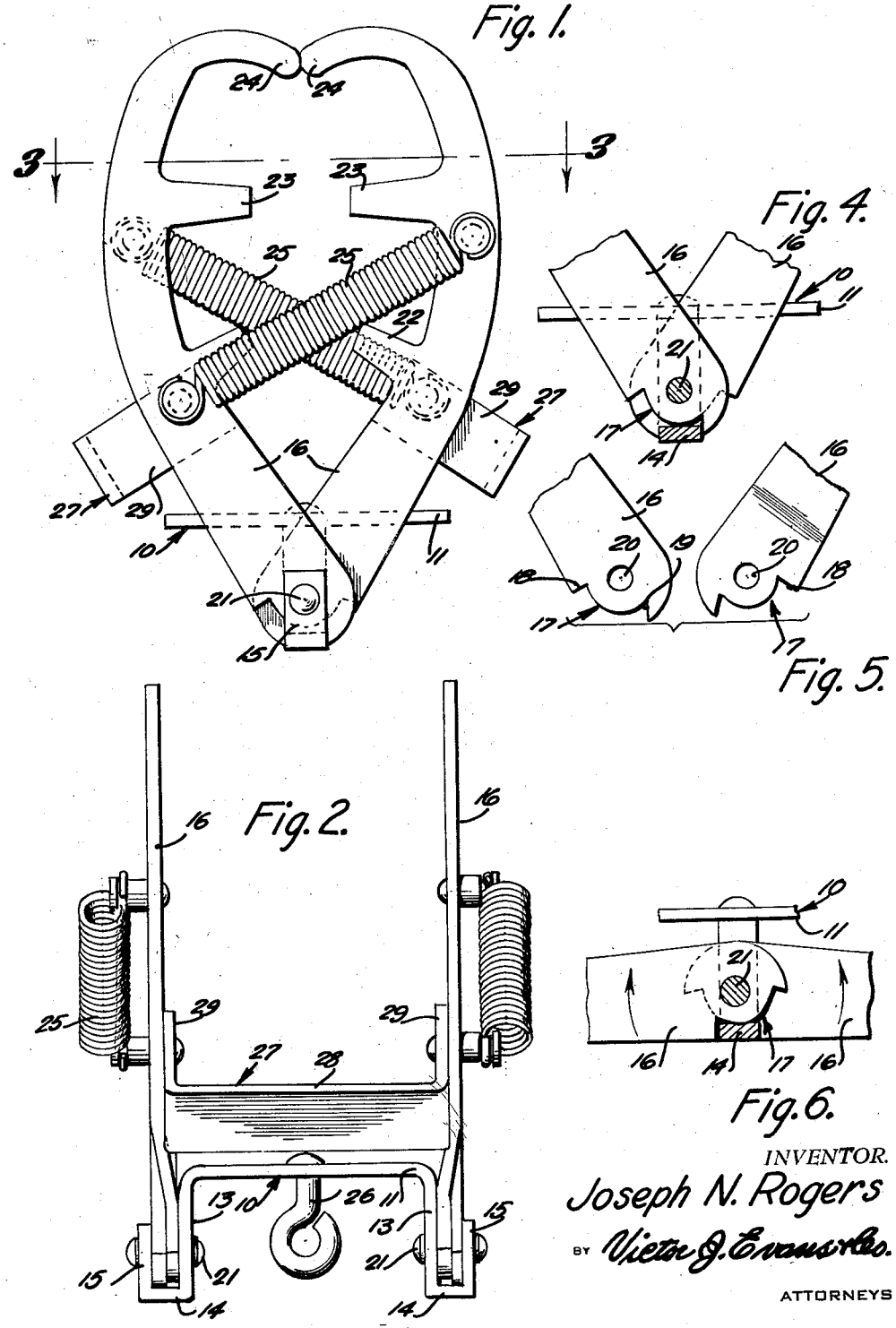
INVENTOR.
Joseph N. Rogers
BY
ATTORNEYS March 15, 1960   J. N. ROGERS   2,928,203
TRAP
Filed Nov. 13, 1958   2 Sheets-Sheet 2
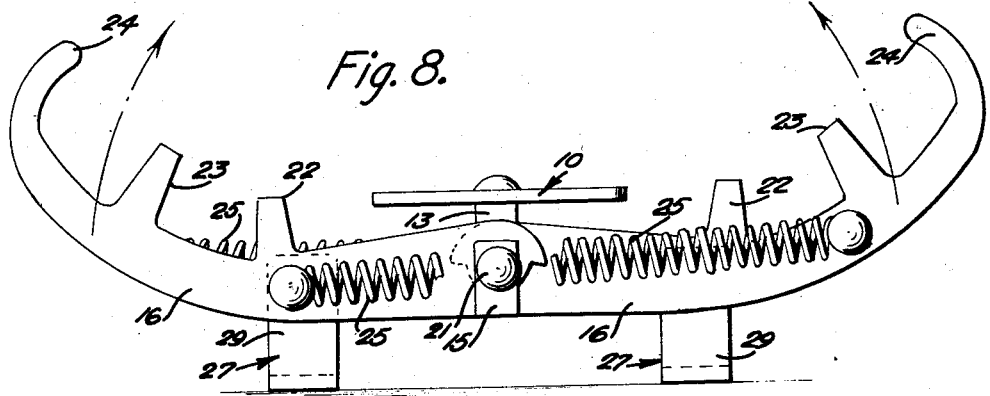
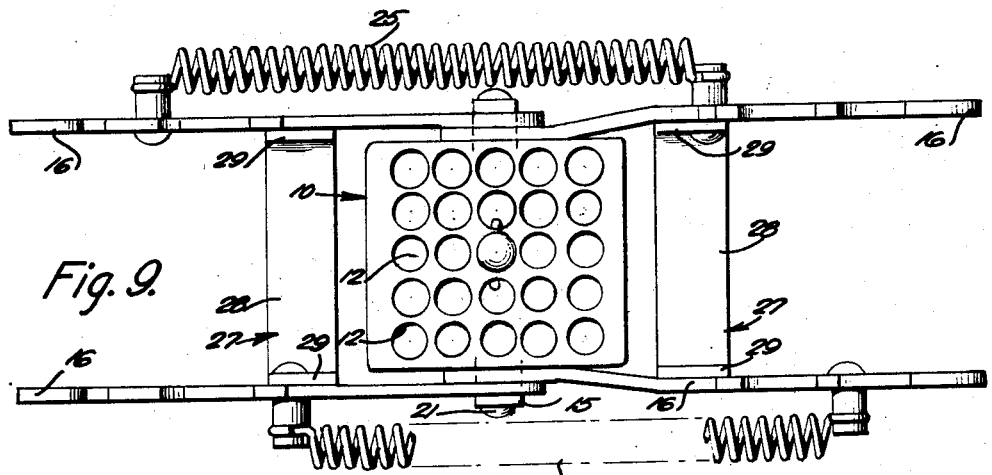
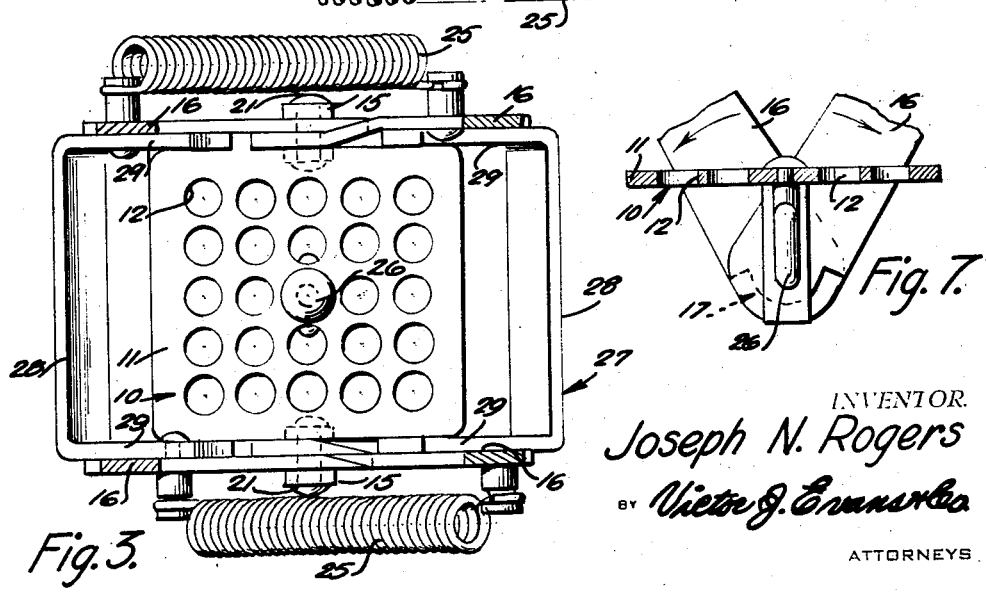
INVENTOR.
Joseph N. Rogers
ATTORNEYS United States Patent Office 2,928,203
Patented Mar. 15, 1960

2,928,203

TRAP

Joseph N. Rogers, Marrero, La.

Application November 13, 1958, Serial No. 773,597

3 Claims. (Cl. 43—92)

This invention relates to a trap.

The object of the invention is to provide a trap which is adapted to be used for catching various animals such as muskrats, minks or the like.

Another object of the invention is to provide a trap which will catch the body of the animal and wherein the trap can be readily set so that the trap can be conveniently used over and over again.

A further object of the invention is to provide a trap which is extremely simple and inexpensive to manufacture.

Other objects and advantages will be apparent during the course of the following description.

In the accompanying drawings, forming a part of this application, and in which like numerals are used to designate like parts throughout the same.

Figure 1 is an elevational view illustrating the trap of the present invention and showing the jaws in closed position.

Figure 2 is a view taken at right angles to the view shown in Figure 1 and with the parts in the position of Figure 1.

Figure 3 is a sectional view taken on the line 3—3 of Figure 1.

Figure 4 is a fragmentary elevational view showing the parts in the position of Figure 1, and with parts broken away and in section.

Figure 5 is a fragmentary elevational view showing certain of the parts separated.

Figure 6 is a view similar to Figure 4 but showing the parts in a different position as for example as shown in Figure 8.

Figure 7 is a fragmentary sectional view showing certain constructional details of the present invention.

Figure 8 is a view similar to Figure 1, but showing the jaws in open position.

Figure 9 is a plan view showing the parts in the position of Figure 8.

Referring in detail to the drawings, the numeral 10 indicates a body member which forms part of the trap of the present invention, and the body member 10 includes a horizontally disposed plate 11 which is provided with a plurality of spaced apart apertures or openings 12 therein, Figures 3 and 9.

Depending from the edges of the plate 11 and secured thereto or formed integral therewith is a pair of vertically disposed spaced parallel first portions 13, and extending outwardly from the lower end of each first portion 13 is a horizontally disposed second portion 14. The numeral 15 indicates a vertically disposed third portion which projects upwardly from each of the second portions 14, Figure 2.

There is further provided pairs of coacting jaws 16 which have a somewhat arcuate or curved formation, Figure 1.

The pairs of jaws 16 are mounted for movement towards and away from each other, and each jaw 16 includes an end portion which is provided with a cutout or slot 17 that defines spaced apart shoulders 18 and 19, Figure 5. These shoulders 18 and 19 are adapted to move into and out of engagement with the portions 14 so as to limit opening and closing movement of the jaws 16.

Each jaw 16 has an aperture or opening 20 through which extends a pivot pin 21 and the pins 21 provide a means for pivotally supporting the end portions of the jaws 16 between the portions 13 and 15 so that for example the jaws 16 can readily move from the position shown in Figure 1 to the position shown in Figure 8 or vice versa.

The jaws 16 are provided with inwardly extending fingers or lugs 22, 23 and 24. There is further provided spring members 25 which are connected to the jaws 16 as shown in the drawings, and the spring members 25 are offset from the centers of the jaws so that the jaws will move with a snap action as for example when an animal steps on the plate 11 so as to cause the parts to move from the position shown in Figure 8 to the position shown in Figure 1 whereby the animal will be caught between the jaws 16.

There is further provided an eyebolt 26 which depends from the plate 11, and a suitable anchoring line or cable may be connected to the eyebolt 26 for preventing accidental loss of the trap.

Each pair of jaws 16 is interconnected by means of a U-shaped support member 27, and it will be seen that each support member 27 includes a base portion 28 as well as side members 29 which are secured to the jaws 16 in any suitable manner, as for example by welding.

From the foregoing, it is apparent that there has been provided a trap which is especially suitable for catching various types of animals such as muskrats, mink or the like. In use, when the trap is set, the parts are arranged as shown in Figures 8 and 9 so that the pairs of jaws 16 are spread apart. As previously stated the spring members 25 are arranged off-center with respect to the jaws 16 so that the jaws 16 will be held open by the spring members when the parts are in the position of Figure 8 or 9. Furthermore, there is provided the support members 27 which provide a support for the trap when the jaws are open.

When an animal steps on or engages the plate 11, the slight downward pressure on the plate 11 will cause the body member 10 to move downwardly from the position shown in Figures 8 and 9 and this slight downward movement will be sufficient to start to move the jaws 16 towards each other and due to the provision of the spring members 25, the jaws will then be quickly snapped closed to the position shown in Figure 1 from the position shown in Figures 8 and 9. As the pairs of jaws 16 are snapped closed by means of the spring members 25, the fingers 24, 23 and 22 will coact to engage the animal therebetween whereby the animal will be caught and cannot escape.

To release the trap, it is only necessary to manually separate the pairs of jaws 16 so as to move the parts from the position shown in Figure 1 back to the position shown in Figure 8 whereby the trap is ready to use over again.

When the parts are in the position of Figure 1, the shoulders 19 on the jaws will engage the portions 14 as for example as shown in Figure 4. Similarly, when the parts are in the position of Figure 8, the shoulders 18 will engage the portions 14, and these shoulders thus define limit stops which serve to insure that the jaws will be maintained in their proper position, whether they are opened or closed.

The trap can be anchored in a desired location by means of a chain or cable which can be connected to the eyebolt 26.

It is to be understood that the trap of the present invention can be used for any desired type of animal such as muskrat, mink or the like, and the trap is highly advantageous to use. In other traps, mink for example is caught by the leg which permits the animal to gnaw at the leg until it is able to get away, but the trap of the present invention will catch the body of the animal. A further advantage of the present invention is that after an animal is caught in the trap and the trapper wishes to remove his catch, all he has to do is to give one pull on the jaws of the trap which releases the animal whereby the trap is automatically set for reuse.

It is to be noted that the clearance in the jaws of the trap insures that the animal will be caught by the body instead of the feet and this permits a baby animal which has no sale value to escape unharmed so as to conserve the muskrat industry for example and this is especially important to the conservation authorities or departments.

Among other advantages that the trap of the present invention possesses over other traps is that it is triggered on off-center which makes it easy to open. The trap requires a spring of less tension than other traps because of the way in which the springs are crossed which helps to keep more tension on top of the trap when the animal is caught. The trap will hold rats of a medium size or large size and it can also be made to catch larger or smaller animals.

Minor changes in shape, size and rearrangement of details coming within the field of invention claimed may be resorted to in actual practice, if desired.

I claim:

1. In a trap, a body member including a horizontally disposed plate, vertically disposed first portions depending from the ends of said plate, horizontally disposed second portions extending outwardly from said first portions, vertically disposed third portions extending upwardly from said second portions, pairs of movable jaws having ends pivotally mounted between said first and third portions, end portions of said jaws being provided with cutouts defining spaced apart shoulders for movement into and out of engagement with said second portions, off-center spring members connecting said pairs of jaws, said spring members being offset from the centers of the jaws so that said jaws will move with a snap action and a U-shaped support member connecting each pair of said jaws, said U-shaped support members providing a support when the jaws are open and simultaneous operation of each pair of jaws.

2. The structure as defined in claim 1, and further including an eyebolt depending from said plate and connected thereto for connecting an anchoring means for said plate to said eyebolt.

3. In a trap, a body member including a horizontally disposed plate, vertically disposed first portions depending from the ends of said plate, horizontally disposed second portions extending outwardly from said first portions, vertically disposed third portions extending upwardly from said second portions, pairs of movable jaws having ends pivotally mounted between said first and third portions, end portions of said jaws being provided with cutouts defining spaced apart shoulders for movement into and out of engagement with said second portions, off-center spring members connecting said pairs of jaws, said spring members being offset from the centers of the jaws so that said jaws will move with a snap action and a U-shaped support member connecting each pair of said jaws, said U-shaped support members providing a support when the jaws are open and simultaneous operation of each pair of jaws, an eyebolt depending from said plate and connected thereto for connecting an anchoring means for said plate to said eyebolt, said jaws having a curved formation, and fingers extending inwardly from the jaws.

References Cited in the file of this patent

UNITED STATES PATENTS

| | | |
|---|---|---|
| 96,821 | Luker | Nov. 16, 1869 |
| 1,322,664 | Wernicke | Nov. 25, 1919 |
| 1,630,607 | Catlin | May 31, 1927 |
| 2,042,728 | Neville | June 2, 1936 |